July 8, 1969 F. GEGAUF 3,454,145
FRICTION COUPLING DEVICE FOR A SEWING MACHINE
Filed July 19, 1967 Sheet 3 of 3

INVENTOR
FRITZ GEGAUF

BY
McGlew & Toren
ATTORNEYS

United States Patent Office 3,454,145
Patented July 8, 1969

3,454,145
FRICTION COUPLING DEVICE FOR
A SEWING MACHINE
Fritz Gegauf, Steckborn, Switzerland, assignor to Fritz
Gegauf Aktiengesellschaft, Bernina-Nahmaschinen-
fabrik, Steckborn, Switzerland
Filed July 19, 1967, Ser. No. 654,546
Claims priority, application Switzerland, Aug. 29, 1966,
12,573/66
Int. Cl. F16d 23/14; D05b 69/00
U.S. Cl. 192—94                                    9 Claims

ABSTRACT OF THE DISCLOSURE

A friction coupling for engaging a driven hand wheel on the driving shaft of a sewing machine utilizing a release screw for tightening a pair of discs, mounted on the screw, against spaced cam surfaces on an intermediate disc, which exerts a tightening force against the hand wheel. The pair of discs each have different properties, the first one has a low coefficient of friction while the second one acts as a cladding preventing distortion of the first one. Each time the release screw is untightened, the area of contact between the disc and the cams change.

SUMMARY OF THE INVENTION

The present invention is directed to a friction coupling device for a sewing machine and, more particularly, to a device in which the coupling may be achieved without requiring excessive tightening of a release mechanism. It has been known in sewing machines to use a hand wheel release screw to tighten and release the hand wheel from the shaft of the machine. The tightening and releasing, which is necessary for the winding of the lower thread, is made considerably easier with the present invention as compared to known release mechanisms.

In sewing machines presently available it is known to employ a hand wheel release mechanism for coupling the hand wheel to a flanged bushing which is secured tightly onto the driving shaft of the sewing machine. The engagement between the hand wheel and the bushing is effected by transmiting pressure from a release screw through an intermediate disc directly to the portion of the hand wheel facing the release screw. In turn, the friction surface of the hand wheel is forced into engagement with the friction surface of the bushing and the friction coupling is effectuated.

The above apparatus is used for obtaining a friction coupling, when sewing thick material a very considerable tightening of the release screw is required before the desired friction is achieved. Since the transmission of pressure in tightening the release screw always occurs in the same place, particularly where a considerable amount of tightening is required, deep pressure indentations are formed in the release screw mechanism and as a consequence further tightening becomes impossible. Additionally, as the mechanism becomes distorted under considerable tightening effort it is also more difficult to release the release screw and this can be achieved only by the exertion of considerable force on the release screw. The need for considerable tightening and loosening effort has made operation of such machines very difficult for seamstresses. As a result, numerous expedients have been employed to both tighten and release the release mechanism. In some instances, tools such as pliers, screwdrivers and the like have been employed, while in other cases it has been necessary to call in a repair man to correct the situation.

These disadvantages are minimized or substantially overcome in the present invention by means of the pressure transmission means employed for reducing the turning power required for either tightening or loosening the release screw and in turn effectuating or discontinuing the friction coupling between the shaft and the hand wheel.

Accordingly, it is a primary object of the present invention to afford a friction coupling which is accomplished in a sewing machine, particularly where thick material is being sewn, by a minimum expenditure of turning power in tightenng or loosening a hand wheel release screw.

Another object of the invention is to provide a disc device having a very low coefficient of friction for transmitting pressure from the release screw to a hand wheel.

Still another object of the invention is to supply a pressure transmission structure in which, during continuous operation, the pressure will be transmitted evenly over its surface and not in one particular area.

Moreover, another object of the invention is to afford means to prevent radial and axial displacement of the pressure transmission device within the friction coupling arrangement.

A still further object of the invention is to supply a means for limiting the extent of rotational motion of the release screw.

A further object of the invention is to provide a friction coupling construction which is simple to assemble and easy to operate.

The various features of novelty which characterize the invention are pointed out with particularity in the claims annexed to and forming a part of this specification. For a better understanding of the invention, its operating advantages and specific objects attained by its use, reference should be had to the accompanying drawings in which there is illustrated and described a preferred embodiment of the invention.

DESCRIPTION OF THE INVENTION

Figure 1:
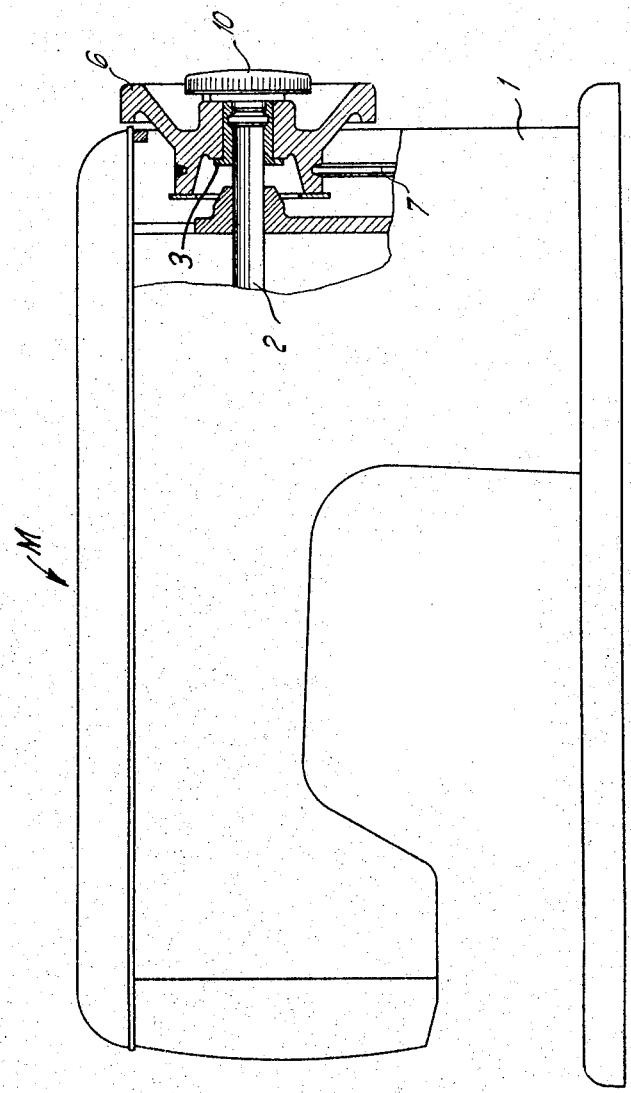
FIG. 1 is a front view, partly in section, of a sewing machine embodying the present invention.
Figure 2:
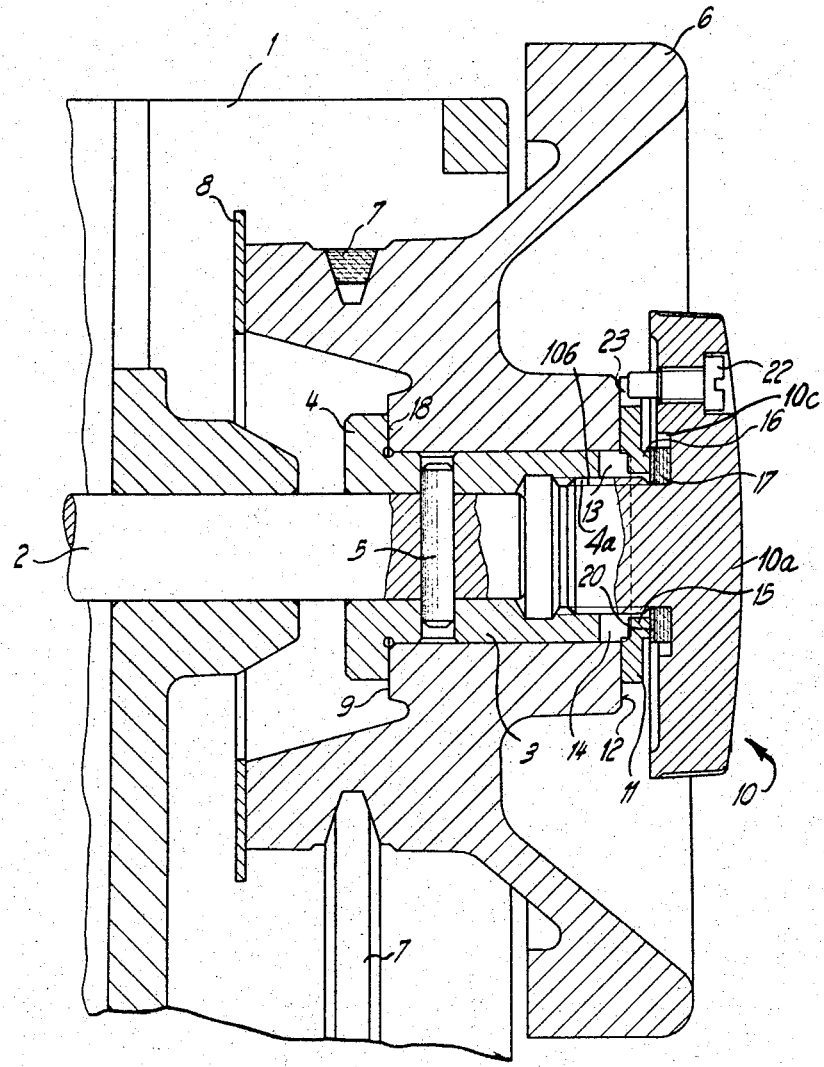
FIG. 2 is a sectional view, on an enlarged scale, of a portion of the sewing machine shown in FIG. 1.

In FIG. 1 a sewing machine M is shown with a portion of the housing 1 cut away to illustrate the interior mechanism which incorporates the present invention. A driving shaft extends through the housing and, as shown in FIGS. 1 and 2, has a bushing 3 located at its end. The bushing 3 has a radially outwardly directed flange 4 positioned at its inner end, and the bushing extends beyond the shaft at its outer end and forms an axial threaded recess 4a. A pin 5 securely positions the bushing on the shaft.

Encircling and fitted on the outer surface of the bushing 3 is a hand wheel 6. The hand wheel has a friction surface 9 which contacts a corresponding friction surface 18 on the flange 4 of the bushing when the hand wheel is moved into its coupled position.

A groove 7a is located on the outer periphery of the hand wheel 6 within the housing 1, within which a V-belt 7 is located. The V-belt is connected to a drive motor (not shown) and in the coupled position it drives the shaft 2 and in the uncoupled position it activates a spool arrangement which may be driven through the disc 8.

Figure 3:
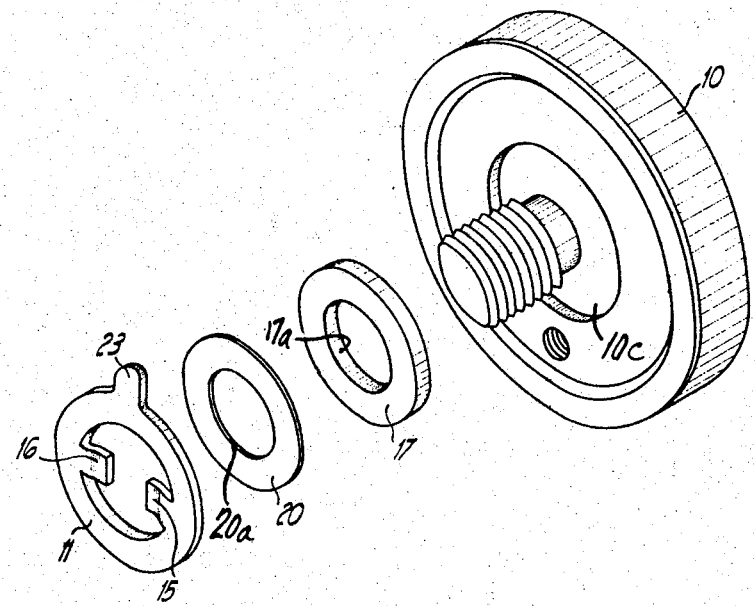
FIG. 3 is an exploded view of a portion of the arrangement shown in FIG. 2.
Figure 4:
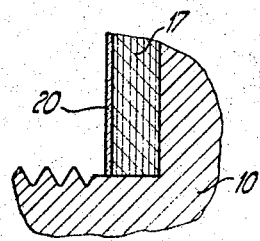
FIG. 4 is a sectional view, on an enlarged scale, of another portion of the arrangement disclosed in FIG. 2.

At the outer end of the bushing 3 and disposed centrally within the hand wheel 6 is a hand wheel release screw 10 formed of a head portion 10a and a threaded pin portion 10b secured within the threaded recess 4a of the bushing. As shown in the exploded view in FIG. 3, the pin portion 10b of the hand wheel release screw 10 has a pair of discs 17 and 20 positioned on it in closely fitting engagement and an intermediate disc 11 encircles the pin in contact with the disc 20 and with the surface 12 of the hand wheel 6. The intermediate disc 11 has an annular or ring shape with a pair of cam members 15 and 16 extending radially inward toward but spaced from the pin portion 10b of the release screw. The annular section of the disc 11 is in contact with the surface 12 of the hand wheel while the cams 15 and 16 are offset outwardly from the surface of the ring section and extend into contact with the disc 20. The bushing 3 has a pair of recesses 13 and 14 in which the cams 15, 16 are positioned, additionally the cams extend beyond the outer end of the bushing into contact with the disc 20. The recesses 13 and 14 hold the cams 15 and 16 and prevent the intermediate disc 11 from turning about the pin portion of the release screw. Extending radially outward from the outer edge of the intermediate disc 11 is a stop member 23. For purposes of illustration, the cam members 15, 16 have been rotated 90° in FIG. 2 from the showing in FIG. 3. The discs 17, 20 provide the pressure transmission means between the head portion 10a of the hand wheel release screw 10 and the intermediate disc 11. The disc 17 is positioned within an annular groove 10c in the inner surface of the head portion 10b. Disc 17 is formed from a plastic material having a very low coefficient of friction, and disc 20 is made of spring steel. The openings 17a, 20a through the discs 17 and 20 fit snugly on the pin portion 10b so that they can turn with the head portion as it is tightened into the bushing 3. However, the discs 17 and 20 are held against radial and axial displacement. As can be seen in FIG. 4, the discs are positioned on the pin portion 10b outwardly of the threads. This is accomplished by placing the discs on the pin portion before the threads are formed.

Figure 5:
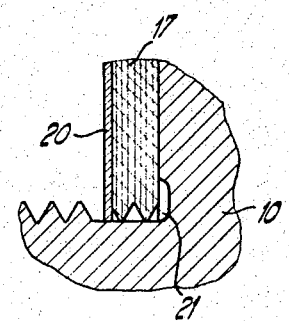
FIG. 5 is an enlarged sectional view showing a modification of the arrangement set forth in FIG. 4.

In an alternate arrangement, as shown in FIG. 5, the discs 17, 20 are threaded on the pin portion for securing them against any axial displacement.

The outer edge of the head portion 10a of the release screw 10 is knurled. Closely inward from the knurled edge of the head portion 10a is a set screw 22 which extends through the head portion into a circular path about the outer periphery of the disc 11. The set screw 22 is intercepted in its path of travel by the stop 23, thereby limiting the extent to which the release screw 10 can be turned and avoiding any excessive tightening or loosening of the screw.

In operation, the pin portion 10b of the release screw 10 is threaded into the recess 4a of the bushing and the screw moves in the direction of the flange 4 on the bushing 3. As the release screw moves inwardly, the discs 17, 20 are pressed against the cam members 15, 16 on the intermediate ring 11. During the initial portion of the turning operation, the discs 17 and 20 turn together with the release screw. However, as the pressure between the discs and the intermediate disc 11 increases, the discs 17, 20 will be held against movement. Through further tightening, the discs become compressed by the cams 15 and 16 and a certain amount of distortion takes place at the point of contact between the cams and the discs 20 and 17. Since in the loosened position the discs 17 and 20 move with the release screw 10, the position at which the cams contact the disc 20 and, in turn, the disc 17, will vary for each cycle of tightening and loosening. In this way the point of contact with the discs changes each time the tightening-loosening cycle is performed and the possibility of any permanent distortion of the disc developing is unlikely. In the prior art this distorting effect had a tendency progressively to increase the amount of tightening required to firmly engage the friction surfaces of the hand wheel and the driving shaft bushing. However, in the present invention, by distributing the area of contact between the cam members 15, 16 and the disc 20, this problem is obviated so that the amount of tightening and loosening will not vary significantly each time that the release screw is threaded into coupling position.

The disc 20 provides a cladding for the disc 17, protecting it from any significant distortion due to the pressure exerted by the cams 15 and 15. Similarly, the disc 17 has a low coefficient of friction so that no noticeable increased effort is required to turn the release screw as the discs are forced against the cam members.

As the release screw 10 is threaded into the recess 4a in the bushing, the pressure exerted through the discs 17 and 20 to the cams 15 and 16 is transferred through the annular section of the disc 11 to the surface 12 on the hand wheel 6. The pressure exerted by the disc 11 on the surface 12 in turn forces the friction surface 9 of the hand wheel 6 against the friction surface 18 of the bushing 3. Due to the elastic deformation of the spring steel disc 20 and its adjacent plastic disc 17 and the low coefficient of friction of the plastic disc, the expenditure of energy in tightening the screw is kept to an exceptionally low value.

To loosen the friction coupling the release screw is turned in the opposite direction and the elastic deformation of the spring steel disc 20 and the plastic disc 17 is relaxed. During the loosening operation, the discs 17, 20 again begin to move with the release screw and the position of contact on the discs with the cam members 15, 16 during the next tightening cycle will be different.

Because of the rotational repositioning of the discs 17, 20 during each tightening and loosening cycle, the erosion and jamming of the cams 15 and 16 on the intermediate ring 11 with the discs 17, 20 is prevented.

It should be noted that the means for transmitting pressure between the release screw and the hand wheel may take various forms both considering the material employed and the form of the pressure transmission means utilized. As an example, the disc 17 may be made from any material that has sufficient resiliency and at the same time has a low coefficient of friction, as long as the material has a sufficiently hard surface for engagement with the cams 15 and 16 whereby there will be no permanent deformation of the surface of the disc. If such a device is available, then the spring steel disc can be omitted. Conversely, if the spring steel disc 20 is provided with surface having a sufficiently low coefficient of friction or it is coated with a material having such a characteristic, then it can be used for the combination of the two discs and the disc 17 may be omitted.

While a specific embodiment of the invention has been shown and described in detail to illustrate the application of the inventive principles, it will be understood that the invention may be embodied otherwise without departing from such principles.

What is claimed is:

1. A friction coupling for a sewing machine comprising a shaft, a bushing secured to said shaft, said bushing having a friction surface thereon, a hand wheel mounted on said bushing and having a first surface arranged to engage the friction surface on said bushing and a spaced second surface, a hand wheel release mechanism comprising a movable release screw having a head portion and a threaded pin portion extending axially therefrom, said bushing having a threaded recess at one end for receiving the threaded pin portion of said release screw; a pressure transmission device positioned on said screw, an intermediate member disposed between said pressure transmission device and the second surface on said hand wheel whereby in moving said release screw in the proper direction, said pressure transmission device exerts pressure on said intermediate member which in turn exerts pressure against the second surface on said hand wheel and forces the first surface on said wheel into engagement with the friction surface on said bushing, and said pressure transmission device comprising a pair of discs having openings therethrough for positioning the discs on said pin portion of said release screw, said discs arranged in closely fitting relationship with said pin portion, whereby said discs are movable for at least a portion of the movement of said release screw for achieving the contact of the friction surface on said bushing and said hand member.

2. A friction coupling as set forth in claim 1, wherein said pair of discs comprise a first disc formed of spring steel in contact with said intermediate member and a second disc formed of a plastic material having a very low coefficient of friction in contact with the first disc and with the head portion of said release screw.

3. A friction coupling as set forth in claim 2, wherein said intermediate member has an opening therethrough and is disposed about said pin portion of said release screw, said intermediate member having an annular ring section spaced from said pin and a pair of cam members extending inwardly toward said pin for said annular ring section, said cam members having a surface offset from the surface of said ring section for contact with said first disc of said pressure transmission device.

4. A friction coupling as set forth in claim 3, wherein said bushing has a pair of recesses in its end adjacent the release screw for receiving the cam members on said intermediate member for preventing the intermediate member from turning about the pin portion of said release screw.

5. A friction coupling device as set forth in claim 4, wherein the head portion of said release screw has an annular groove therein and said second disc of said pressure transmission device is positioned within said groove.

6. A friction coupling as set forth in claim 2, wherein the pin portion of said release screw is upset adjacent said second disc of said pressure transmission device to prevent the axial displacement of said first and second discs on said pin portion.

7. A friction coupling as set forth in claim 3, wherein a stop extends radially outward from the annular ring section of said intermediate member, and a set screw extends through the head portion of said release screw and into a circular path about the outer periphery of said annular ring section whereby the stop intercepts said set screw and limits the extent of the rotational movement of said release screw.

8. A friction coupling as set forth in claim 1, wherein a pin extends through said shaft and into said bushing for securing the bushing onto said shaft.

9. A friction coupling as set forth in claim 6, wherein means are formed on said pin portion of said release screw for engaging the inner surfaces of said first and second discs for securing said discs against axial displacement.

References Cited

UNITED STATES PATENTS

| 891,280 | 6/1908 | Morgan | 192—95 |
| 2,247,381 | 7/1941 | Hohmann et al. | 112—220 |
| 2,863,410 | 12/1958 | Lange et al. | 192—94 |

FRED C. MATTERN, JR., *Primary Examiner.*

W. S. RATLIFF, JR., *Assistant Examiner.*

U.S. Cl. X.R.

74—625; 112—220; 192—95